Dec. 2, 1930.  E. J. KEARNEY  1,783,653
ADJUSTABLE HOUSING
Filed March 8, 1928

INVENTOR
Edward J Kearney
BY
Fred G Parsons
ATTORNEY

Patented Dec. 2, 1930

1,783,653

UNITED STATES PATENT OFFICE

EDWARD J. KEARNEY, OF WAUWATOSA, WISCONSIN, ASSIGNOR TO KEARNEY & TRECKER CORPORATION, OF WEST ALLIS, WISCONSIN

ADJUSTABLE HOUSING

Application filed March 8, 1928. Serial No. 260,107.

This invention relates to improvements in adjustable housings or guards for pulleys and belts and is particularly directed toward such devices in connection with machine tools.

Such machines, if belt driven, are ordinarily driven from an overhead line shaft, and the position of the line shaft, the diameter of pulley required thereon and the direction of rotation thereof may vary, for which reason a satisfactory belt guard must be capable of swiveling about the axis of the driven pulley and of adjustment to provide for both open and crossed belts having the oppositely moving runs or portions at a variety of mutual angles.

It is a main object of the present invention to simplify and improve the construction and operation of guards or housings such as above indicated, and other objects will be apparent from this specification.

The invention consists in the particular construction herein illustrated, described and claimed, and in such modifications of the structure shown as may be the equivalent of the structure claimed.

In the drawings like reference characters designate the same parts in each view.

Figures 1, 2, 3:
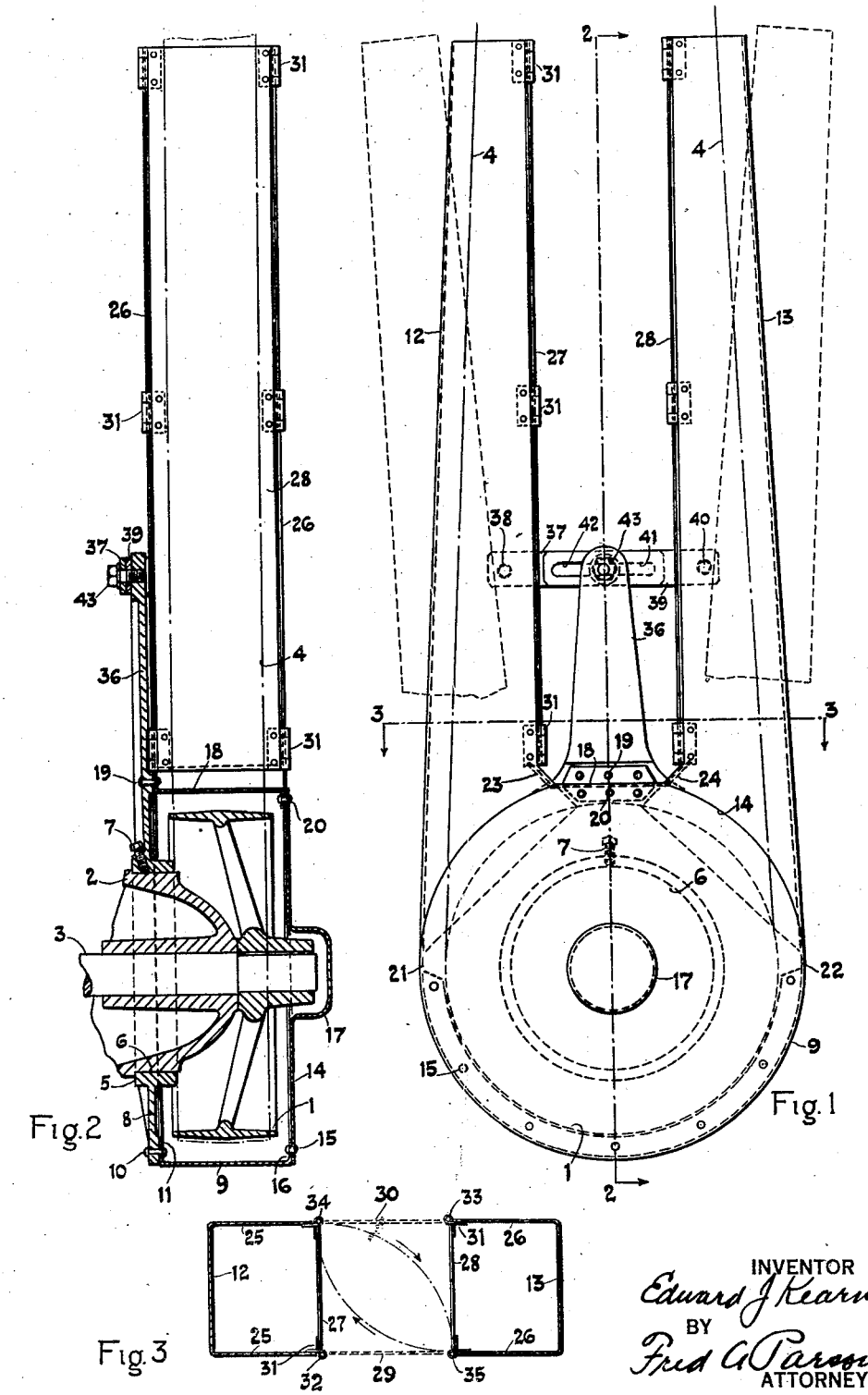
Fig. 1 is an elevation, vertical to the axis of the pulley, of a belt guard therefor and embodying the invention.
Fig. 2 is a section along line 2—2 of Fig. 1.
Fig. 3 is a section along line 3—3 of Fig. 1.

A pulley 1 drives a machine tool of which only a portion 2 of the frame thereof is shown, such portion providing a bearing rotatably supporting a shaft 3 for driving the machine tool and on which the drive pulley 1 is fixed. A belt 4 engages pulley 1 and extends upwardly to engage a line shaft pulley, not shown. The other structure shown constitutes an adjustable guard for pulley 1 and belt 4 as will be described.

A member 5 provides a bore 6 fitted to and supported from a complementary finished surface on frame portion 2, such surface being concentric with the axis of shaft 3, whereby member 5 may swivel about the axis of the pulley. Member 5 may be locked or clamped in any of its various swivelling positions by the means of a screw 7 threaded in member 5 and projecting to bind against the frame surface on which member 5 is supported.

Member 5 has a circular flange 8 to which is fixed a sheet metal member 9. The lower portion of member 9 in Figs. 1–2 encircles the pulley 1 and is fixed with flange 8 by the means of rivets as 10, and a flange portion 11 extended about halfway around the pulley. Portions 12—13 extend upwardly in the form of channels as shown in Fig. 3. A circular plate member 14 is fixed with member 9 over about half its lower diameter in Figs. 1–2 by the means of rivets as 15, and a flange 16. Member 14 is formed as at 17 to clear the pulley hub and shaft and in addition to the spacing means provided by member 9 is further fixed with member 5 by the means of a spacer 18, bent at the ends to be riveted to flange 8 of member 5 by rivets 19 and to member 14 by rivets 20. The member 9 is formed to be flexible at portions 21—22, Fig. 1, the flanges being cut away for this purpose as shown, whereby the portions 12 and 13 are pivoted at 21 and 22 respectively, for adjustment to different belt conditions, as indicated by dotted lines, Fig. 1.

Openings which might otherwise be formed during adjustment of members 12—13 are closed in all positions of adjustment by means of extended portions 23—24 fixed with member 18.

The opposed edges of the bent channel portion 25—25, 26—26, Fig. 3, are of such form in relation to the individual pivots of the members 12—13 that during the pivoted movement in the position of adjustment shown in Fig. 1, a space is formed between the opposed edges, in which is defined by parallel lines spaced substantially the same distance apart in the plane at right angles to the pulley axis, as are the parallel portions 25—25, or 26—26 in a plane parallel to the pulley axis. By reason of such construction removable wall members such as 27—28 may be used in different positions corresponding to two belt conditions. In the one position of the wall members, as shown by the full lines Fig. 3, they close the space between the edges of the members 12—13 to form therewith two separate belt channels or housings extending from the periphery of pulley 1 and adapted to be individually adjusted to guard the respective oppositely running portions of an open belt. In the other position of the wall members, indicated at dotted lines 29—30, Fig. 3, they act as spacers for members 12—13 and complete a single substantially closed housing adapted to enclose both belt runs and to permit crossing of the belt at a variety of relative angle between oppositely moving belt portions. Suitable means for retaining members 27—28 in either position are provided. In this case hinges such as 31, Fig. 3 are provided for member 27 to be pivoted at 32 and for member 28 to be pivoted at 33. Fastening portions at 34 and 35 receive and fix the position of complementary fastening portions fixed on either member 27 or 28. Such fastenings may also be hinges but with removable pintle pins, or of any other suitable form.

Means are provided for fixing the portions 12—13 in various positions of adjustment about the pivots 21—22 as follows.

Member 5 is provided with an arm 36 fixed thereon. A member 37 is pivotally fixed with portion 12 at 38, and a member 39 is pivotally fixed with portion 13 at 40. Slots 41—42 in the respective members 37—39 are engaged by a screw 43 threaded in arm 34, whereby the screw may be loosened to permit movement of members 37—39 with portions 12—13 or may be tightened to fix the positions thereof.

It is to be understood that certain of the described parts have different portions which although here shown formed of an integral metal structure for the sake of simplicity of drawings and description, may and probably will be formed of separate portions joined together for convenience of manufacture, but which when so formed will be the equivalent of the structure shown.

What is claimed is:

1. The combination for a machine having a frame and a pulley rotatably supported therefrom, of a hollow housing for a belt engaging said pulley, said housing being supported from said frame and including wall members forming a plurality of channels spaced apart, other wall members alternatively movable to different positions relative to said channels and adapted when in one position to form therewith a plurality of closed passageways respectively for oppositely moving belt runs, and when in another position to form with said channels a single closed passageway for both belt runs.

2. The combination, for a machine having a frame and a pulley rotatably supported therefrom, of a hollow housing for a belt engaging said pulley, said housing having different portions relatively adjustable in a plane substantially vertical to the axis of said pulley, and having a spaced apart position during such adjustment, said portions having wall members some of which are alternatively movable to different positions relative to the other wall members, and adapted when in one position of relative movement to form with said other members a plurality of closed passageways respectively individual to said different housing portions, and when in another position to cooperate with said other members in the spaced apart position of said housing portions to form a single closed passageway.

3. The combination for a machine tool having a frame and a pulley rotatably supported therefrom, of a housing supported from said frame and having portions extended to guard a belt engaging said pulley, said portions having wall members some of which are pivotally movable to a plurality of positions relative to other wall members and adapted when in one position of such pivoted movement to form with said other wall members a plurality of closed passageways respectively for the different runs of said belt, and when in another position of said pivoted movement to form with said other wall members a single closed passageway for both belt runs.

In witness whereof I hereto affix my signature.

EDWARD J. KEARNEY.